United States Patent
Wada

(10) Patent No.: US 7,606,447 B2
(45) Date of Patent: Oct. 20, 2009

(54) MACH-ZEHNDER TYPE SEMICONDUCTOR DEVICE AND METHOD OF CONTROLLING THE SAME

(75) Inventor: Hiroshi Wada, Tokyo (JP)

(73) Assignee: Oki Semiconductor Co., Ltd., Tokyo (JP)

( * ) Notice: Subject to any disclaimer, the term of this patent is extended or adjusted under 35 U.S.C. 154(b) by 0 days.

(21) Appl. No.: 11/711,749

(22) Filed: Feb. 28, 2007

(65) Prior Publication Data

US 2007/0217733 A1    Sep. 20, 2007

(30) Foreign Application Priority Data

Mar. 16, 2006  (JP) .............. 2006-072775

(51) Int. Cl.
*G02F 1/035* (2006.01)
(52) U.S. Cl. .......................... 385/3; 385/131
(58) Field of Classification Search ............ 385/49–50, 385/131; 372/44.01; 359/332; 333/100.117
See application file for complete search history.

(56) References Cited

U.S. PATENT DOCUMENTS

| | | | |
|---|---|---|---|
| 4,291,939 A * | 9/1981 | Giallorenzi et al. ............ 385/9 |
| 4,415,226 A * | 11/1983 | Verber et al. .................... 385/10 |
| 4,866,406 A * | 9/1989 | Minakata et al. ............. 359/315 |
| 4,966,431 A * | 10/1990 | Heismann ....................... 385/11 |
| 5,034,603 A * | 7/1991 | Wilson .................... 250/227.27 |
| 5,036,220 A * | 7/1991 | Byer et al. ................... 359/328 |
| 5,099,489 A * | 3/1992 | Levi et al. .................... 372/38.1 |
| 5,119,447 A * | 6/1992 | Trisno ............................. 385/3 |
| 5,182,665 A * | 1/1993 | O'Callaghan et al. ........ 349/201 |
| 5,189,714 A * | 2/1993 | Okayama et al. .............. 385/27 |
| 5,325,382 A * | 6/1994 | Emura et al. ................... 372/26 |
| 5,334,854 A * | 8/1994 | Ono et al. ........................ 257/13 |
| 5,388,106 A * | 2/1995 | Tabuchi ......................... 372/20 |
| 5,400,417 A * | 3/1995 | Allie et al. ...................... 385/2 |
| 5,428,701 A * | 6/1995 | St Ville et al. ................. 385/40 |
| 5,581,643 A * | 12/1996 | Wu .............................. 385/17 |

(Continued)

FOREIGN PATENT DOCUMENTS

EP       319286 A2 *  6/1989

(Continued)

OTHER PUBLICATIONS

Claude Rolland et al., "InGaAsP-based Mach-Zhnder modulators for high-speed transmission systems", Optical Fiber Communication Conf. 1998, p. 283-284.

*Primary Examiner*—Frank G Font
*Assistant Examiner*—Peter Radkowski
(74) *Attorney, Agent, or Firm*—Volentine & Whitt, P.L.L.C.

(57) ABSTRACT

A Mach-Zehnder type semiconductor device includes electrodes for injecting carriers into first and second branch waveguides so as to change reflection indexes of the first and second branch waveguides. The device further includes electrodes which are placed above either one of the first or second branch waveguides or both of the first or second branch waveguides so as to remove the carriers. The Mach-Zehnder type semiconductor device can adjust a phase difference between first and second split light transmitted through the first and second branch waveguides, respectively, even if the lengths of the first and second branch waveguides deviate from designed values. The Mach-Zehnder type semiconductor device also can suppress optical loss of the first and second light, and generate outgoing light without deterioration.

11 Claims, 10 Drawing Sheets

U.S. PATENT DOCUMENTS

| | | | | |
|---|---|---|---|---|
| 5,659,560 | A * | 8/1997 | Ouchi et al. | 372/27 |
| 5,710,653 | A * | 1/1998 | Nemecek et al. | 398/194 |
| 5,953,149 | A * | 9/1999 | Ishizaka | 359/248 |
| 5,991,471 | A * | 11/1999 | Yu | 385/3 |
| 6,002,510 | A * | 12/1999 | Ishizaka | 359/248 |
| 6,097,525 | A * | 8/2000 | Ono et al. | 398/185 |
| 6,198,853 | B1 * | 3/2001 | Yamada | 385/2 |
| 6,229,631 | B1 * | 5/2001 | Sato et al. | 398/30 |
| 6,337,756 | B1 * | 1/2002 | Djupsjobacka | 398/183 |
| 6,388,786 | B1 * | 5/2002 | Ono et al. | 398/183 |
| 6,392,779 | B1 * | 5/2002 | Iannelli et al. | 359/245 |
| 6,600,842 | B2 * | 7/2003 | Yamada | 385/2 |
| 6,859,568 | B2 * | 2/2005 | Noe et al. | 385/11 |
| 6,954,558 | B2 * | 10/2005 | Liu | 385/3 |
| 6,970,655 | B2 * | 11/2005 | Ono et al. | 398/186 |
| 7,035,487 | B2 * | 4/2006 | Samara-Rubio et al. | 385/3 |
| 7,127,129 | B2 * | 10/2006 | Liu | 385/3 |
| 7,218,040 | B2 * | 5/2007 | Toda | 310/369 |
| 7,340,116 | B2 * | 3/2008 | Toyoda et al. | 385/9 |
| 7,356,227 | B2 * | 4/2008 | Toyoda et al. | 385/45 |
| 7,425,726 | B2 * | 9/2008 | Ranganath | 257/79 |
| 2002/0071621 | A1 * | 6/2002 | Yamada | 385/2 |
| 2003/0138179 | A1 * | 7/2003 | Akiyama et al. | 385/2 |
| 2004/0213497 | A1 * | 10/2004 | Liu | 385/3 |
| 2006/0209911 | A1 * | 9/2006 | Takabayashi | 372/20 |
| 2007/0058896 | A1 * | 3/2007 | Toyoda et al. | 385/3 |
| 2007/0248362 | A1 * | 10/2007 | Tanaka et al. | 398/189 |
| 2007/0253659 | A1 * | 11/2007 | Toyoda et al. | 385/3 |

FOREIGN PATENT DOCUMENTS

| | | | |
|---|---|---|---|
| EP | 590943 | A1 * | 4/1994 |
| JP | 2000-028979 | | 1/2000 |
| WO | WO 2004/083953 | * | 3/2004 |

* cited by examiner

MACH-ZEHNDER TYPE SEMICONDUCTOR DEVICE AND METHOD OF CONTROLLING THE SAME

BACKGROUND OF THE INVENTION

1. Field of the Invention

The present invention relates to a Mach-Zehnder type semiconductor device and a method of controlling the same.

2. Description of the Related Art

A Mach-Zehnder type optical modulator usable for an optical communication system and an optical information processing system is disclosed in, for example, "Japanese Patent Kokai No. 2000-28979" where a $LiNbO_3$ crystal is used as a material for the modulator.

A Mach-Zehnder type optical modulator using semiconductor materials is advantageous in miniaturization because the device length using semiconductor materials is one several tenth of that using the $LiNbO_3$ crystal, and also is advantageous because of its easiness for integration with other optical devices.

A conventional MZ type semiconductor device disclosed in, for example, "Claude Rolland et al., InGaAsP-based Mach-Zehnder modulators for high-speed transmission systems", Optical Fiber Communication Conference 1998 (OFC'98), p. 283-284. (a document D1) will now be described with reference to the accompanying drawings.

FIGS. 1A and 1B represent schematic drawings which show a conventional MZ type semiconductor device. FIG. 1A is a plan view showing the conventional MZ type semiconductor device. FIG. 1B is a cross-section view showing a cross-section of the MZ type semiconductor device taken along A-A line in FIG. 1A.

The conventional MZ type semiconductor device 100 disclosed in the document D1 has a MZ (Mach-Zehnder) type modulator 110 and a DFB (Distributed Feedback) laser 120, both of which are formed on a InP substrate 22 having n-type conductivity (an n-InP substrate) as a semiconductor substrate. A laser light emitted by the DFB laser 120 is incident to the MZ type modulator 110.

The MZ type modulator 110 has an n-InP substrate 22, a waveguide layer 30 formed on the n-InP substrate 22, and a p-InP layer 26 formed on the waveguide layer 30. It is to be noted that the p-InP layer 26 is not shown in FIG. 1A and a cap layer etc. for protecting the modulator is not also shown in FIGS. 1A and 1B for the sake of simplicity.

The waveguide layer 30 includes an entrance waveguide 32, an optical splitter 33, a first branch waveguide 34, a second branch waveguide 36, an optical coupler 37, and an exit waveguide 38. The entrance waveguide 32 guides propagation of the laser light emitted by the DFB laser 120 as an incident light to the optical splitter 33. The optical splitter 33 connected to the entrance waveguide 32 splits the laser light transmitting through the entrance waveguide 32 into first and second split lights. The first branch waveguide 34, which is connected to the optical splitter 33 and the optical coupler 37, guides propagation of the first split light passing through the optical splitter 33 to the optical coupler 37. The second branch waveguide 36, which is connected to the optical splitter 33 and the optical coupler 37, guides propagation of the second split light passing through the optical splitter 33 to the optical coupler 37. The optical coupler 37 recombines the first and second split lights passing through the first branch waveguide 34 and the second branch waveguide 36, respectively, so as to generate an outgoing light. The exit waveguide 38 connected to the optical coupler 37 guides propagation of the outgoing light passing through optical coupler 37. The outgoing light passing through the exit waveguide 38 is emitted by the MZ type modulator 110.

The MZ type modulator 110, in which the first and second branch waveguides 34 and 36 have the same path length, will be described. It should be noted that the path length is defined as a geometrical length of the waveguide. The first and second split lights, which are split by the optical splitter 33, transmit through the first and second branch waveguides 34 and 36, respectively, and the two split lights are recombined by the optical coupler 37. A phase difference between the first and second split lights recombined by the optical coupler 37 is 0 degrees.

A first modulating electrode 42 is provided above the first branch waveguide 34. A refraction index of the first branch waveguide 34 which exists under the first modulating electrode 42 is changed in response to a voltage applied to the first modulating electrode 42. A second modulating electrode. 44 is provided above the second branch waveguide 36 similarly to the first modulating electrode 42. A refraction index of the second branch waveguide 36 under the second modulating electrode 44 is changed in response to a voltage applied to the second modulating electrode 44.

A voltage is applied to either one of the first modulating electrode 42 or the second modulating electrode 44 or two different voltages are applied to the first modulating electrode 42 and the second modulating electrode 44, respectively, thus causing an electric potential difference between the first modulating electrode 42 and the second modulating electrode 44. Thereby, the reflection indexes of the first and second branch waveguides 34 and 36 are changed, the values of which are different from each other. Each optical length of the first branch waveguide 34 and the second branch waveguide 36, through which the first split light and the second split light travel, respectively, is given by a product of the path length and the refraction index, as is well-known. If the refraction indexes of the first branch waveguide and the second branch waveguide are different from each other, a phase difference between the first split light and the second split light causes when the optical coupler 37 recombines the two lights. As a result, the optical intensity of the outgoing light, which is recombined with the first and second split lights by the optical coupler 37, changes in accordance with the phase difference.

In the case that the phase difference between the recombined first and second split lights is 180 degrees, the optical intensity of the outgoing light has a minimum, that is, the MZ type modulator 110 is turned off. In the case that the phase difference between the recombined first and second split lights is 0 degrees, the optical intensity of the outgoing light has a maximum, that is, the MZ type modulator 110 is turned on.

However, in the case that the first and second branch waveguides have the lengths different from each other, the modulation voltages required for turning on or off the MZ type modulator fluctuate corresponding to the path lengths of the first and second branch waveguides. For instance, if a light having a wavelength of 1.55 micro meters and the waveguide having a reflection index of 3.2, which is a typical value of a waveguide formed from semiconductor materials, are given, a path length of the waveguide corresponding to the phase difference of 180 degrees is 0.242 (=1.55/3.2/2) micro meters. In order to suppress fluctuations in the modulation voltages of the device, it is necessary to that a difference $\Delta L$ in the path length between the waveguides is reduced up to about one tenth of the path length of the waveguide corresponding to the phase difference of 180 degrees, that is, 0.0242 micro meters. A typical path length from the optical splitter to the optical coupler is longer than 600 micro meters. Thus, it is extremely difficult to form waveguides in which the difference in the path length between the waveguides is 0.0242 micro meters because the path lengths are designed to an accuracy of 0.04% and more of the difference in the path length between the waveguides.

The fluctuations in the phases of the two lights respectively transmitting through the two waveguides between which there is the difference in the path length are conventionally adjusted by applying a modulation voltage in addition to a direct current (DC) bias voltage to modulating electrodes.

The conventional phase adjustment effect will be described with reference to FIGS. 2A, 2B, and 2C. FIGS. 2A, 2B, and 2C are graphs showing optical properties to describe the phase adjustment effect, each representing a relation between optical loss in intensity of the outgoing light and modulation voltages applied to the first modulating electrode and the second modulating electrode. Each horizontal axis of FIGS. 2A, 2B, and 2C represents a first voltage V1 (volts) applied to the first modulating electrode as a modulation voltage, while each vertical axis represents optical loss (dB) in intensity of the outgoing light for the conventional MZ type modulator. Curves I, II, III, and IV show optical loss profiles of the outgoing light emitted when the second voltages applied to the second modulating electrode are 0, −0.5, −1, and −1.5 volts, respectively. It should be noted that the path lengths of the first and second branch waveguides are so designed that the MZ type modulator is turned on when the first and second voltages V1 and V2 are 0 volts and turned off when the first and second voltages V1 and V2 are −4 and 0 volts, respectively.

FIG. 2A shows a relation between optical loss of the outgoing light and modulating voltages applied to the first and second modulating electrodes for the MZ modulator in which path lengths of the first branch waveguide. and the second branch waveguide are formed as they are designed. The curvature I (V2=0 volts) has a minimum (−30 dB) at the first voltage V1 of 0 volts, indicating that the MZ type optical modulator is turned off. On the other hand, the curvature I has a maximum (−10 dB) around at the first voltage of −4 volts, indicating that the MZ type optical modulator is turned on. As increasing the second voltage V2, the first voltage V1 at which the MZ type modulator is turned off increases as denoted by an arrow V in FIG. 2A. As described, the first voltage V1 at which the MZ type optical modulator is turned off can be adjusted by changing the second voltage V2.

However, there is a problem as follows. As increasing the first and second voltages V1 and V2 applied to the first and second modulation terminals, respectively, the first and second split lights are likely to loss in intensity due to an electro-optical effect when transmitting through regions of the first and second waveguides where the first and second voltages are applied. FIG. 3 is an optical characteristic for representing intensity loss of the outgoing light as a function of the first voltage V1. The vertical axis represents optical loss in intensity of the outgoing light (dB) and the horizontal axis represents the first voltage V1 (volts). FIG. 3 is a calculation result of the outgoing light as a function of the first voltage V1 for the MZ type modulator whose device length is 600 micro meters. As increasing the negative first voltage V1, the loss in intensity gradually increases and drastically increases around at the first voltage of −4 volts. As increasing the phase difference, the optical loss in intensity of the light increases when the phase difference is adjusted. Thus, the optical loss in intensity of the light increases when the device is turned on. It is indicated from V1 denoted in FIG. 2A that as increasing the absolute value of the second voltage V2, the loss of the light increases in intensity at the first voltage V1 of −4 volts at which the modulator is turned on.

FIG. 2B shows a relation between optical loss in intensity of the outgoing light and modulating voltages applied to the first and second modulating electrodes for the MZ type modulator in which path lengths of the first branch waveguide and the second branch waveguide are deviated from those designed values. The MZ type modulator is turned off at the second voltage V2 of 0 volts (curve I) and the first voltage V1 in a range of a positive voltage, that is, when the optical intensity loss has a minimum point (not shown in FIG. 2B). As decreasing the second voltage V2, the first voltage V1 at which the MZ type modulator is turned off decreases. The MZ type modulator is turned off at the second voltage V2 of −1.5 volts (curve IV) and the first voltage V1 of about 0 volts. On the other hand, the MZ type modulator is turned on at the second voltage V2 of −1.5 volts (curve IV) and the first voltage V1 of about 4 volts. The MZ type modulator, to which the first and second voltages shown in FIG. 2B are applied, can be operated by setting the second voltage V2 to a favorable value.

In the case that the second voltage of −1.5 volts is applied, optical intensity loss of light transmitting through at a region of the waveguide where the second voltage is applied is increased due to the electro-optical effect. Therefore, the loss in intensity of the outgoing light produced when the MZ modulator is turned on is larger than that shown in FIG. 2A.

FIG. 2C shows a relation between optical loss in intensity of the outgoing light and the modulation voltage applied to the first and second modulation electrodes for the MZ type modulator in which a pass difference between the two waveguides is longer than that of the case shown in FIG. 2B. It is required that the second voltage V2 is in a range of −3 to −4 volts to modify a phase difference (not shown in FIG. 2C). The loss in intensity of the outgoing light is so large that the MZ type modulator is not for practical use.

As described above, the MZ type modulator where the phase difference between the first and second split lights is large beyond necessity is impractical.

Inventors applying for this application of the present invention devote themselves to an investigation for a MZ modulator that can solve the above-mentioned problems and found that the phase of the two lights can be adjusted by applying a voltage added to a positive bias voltage as a modulation voltage.

A phase adjusting effect will be now described with reference to FIG. 4. FIG. 4 is a graph showing a first voltage V1 versus a second voltage V2 for the MZ type semiconductor device 100 shown in FIG. 1A. The first and second voltages V1 and V2 are applied to the first and second modulating electrodes 42 and 44, respectively. Vertical and horizontal axes of the graph represent the first voltage V1 (volts) at which the MZ type semiconductor device 100 is turned off and the second voltage V2 (volts).

The first voltage V1 at which the MZ type modulator 100 is turned off is −4.7 volts when the second voltage V2 of −3 volts is applied. As increasing the second voltage V2, that is, as the second voltage V2 approaching to 0 volts, the first voltage V1 at which the MZ type modulator 100 is turned off gradually approaches to 0 volts. As further increasing the second voltage V2, the first voltage V1 at which the MZ type modulator 100 is turned off suddenly increases around at the second voltage V2 of 0.5 volts. This phenomenon originates in a plasma effect caused by the carriers injected into the waveguide layer.

In general, a change of reflection index originating in the plasma effect is larger than that originating in the electro-optical effect. Therefore, if the positive bias voltage is applied, the first voltage V1 at which the MZ type modulator becomes an off state changes more largely, indicating that the MZ type modulator has a high phase adjustment function. Furthermore, a light losses in intensity due to the electro-optical effect in the case that a negative bias voltage is applied, whereas a light does not loss in intensity due to the electro-optical effect in the case that the positive bias voltage is applied. As a result, the phase adjustment can be efficiently performed.

However, there is a possibility that the carriers injected into the waveguide by applying the positive bias voltage leak from a region where the positive bias voltage was applied, thus causing deterioration in an eye pattern of the outgoing light.

FIGS. 5A and 5B are drawings for describing a carrier injection. FIG. 5A shows the carrier injection schematically. A horizontal axis of FIG. 5B represents a position in the direction of a light and a horizontal axis of FIG. 5B represents an electric potential V. FIGS. 5A and 5B shows the carrier injection for the conventional MZ type semiconductor device described with reference to FIG. 1A similar to FIG. 4 in the case that the positive bias voltage is applied to the first modulating electrode 42. By applying the positive bias voltage to the first modulating electrode 42, carriers are injected into a region of the waveguide layer 30 which exists under the first modulating electrode 42. The carriers diffuse out a region of the first branch waveguide 34 which exists under the first modulating electrode 42. If the carriers are modulated under the second modulation voltage applied to the second modulating electrode 44, an eye pattern of the outgoing light will be disturbed.

SUMMARY OF THE INVENTION

It is an object of the present invention to provide a Mach-Zehnder type semiconductor device that can adjust a phase difference even if lengths of two waveguides are deviated from those designed values and suppress loss in intensity of a light and not to deteriorate an eye pattern.

According to a first aspect of the present invention, there is a provided a Mach-Zehnder type semiconductor device including a waveguide layer having a first conductive type formed on one of principle surfaces of a semiconductor substrate, a semiconducting layer having a second conductive type formed on the waveguide layer, and a common electrode formed on the other of principle surfaces of the semiconductor substrate.

The waveguide layer includes an entrance waveguide, an optical splitter, a first branch waveguide, a second branch waveguide, an optical coupler, an exit waveguide. The entrance waveguide guides propagation of an incident light entered from outside of the Mach-Zehnder type semiconductor device. The optical splitter connected to the entrance waveguide splits the incident light into first and second split lights. The first branch waveguide connected to the optical splitter guides propagation of the first split light. The second branch waveguide connected to the optical splitter guides propagation of the second split light. The optical coupler connected to the first and second branch waveguides recombines the first and second split lights so as to produce an output light. The exit waveguide connected to the optical coupler guides propagation of the outgoing light so as to emit the output light from the Mach-Zehnder type semiconductor device.

A modulation electrode is provided above the first branch waveguide, for changing a refraction index of the first branch waveguide by applying a modulated voltage across the modulation electrode and the common electrode. A phase adjusting electrode group having a first negative bias electrode, a positive bias electrode, and a second negative electrode, which are provided above the second branch waveguide in sequence in the direction of propagation of the second split light and separated from each other is provided. The positive bias electrode changes a refraction index of the second branch waveguide by applying a positive bias voltage across the positive bias electrode and the common electrode so as to inject carriers to the second branch waveguide. The first and second bias electrodes remove the carriers from the second branch waveguide to the semiconducting layer by applying a first negative bias voltage across the first bias electrode and the common electrode and a second negative bias voltage across the second bias electrode and the common electrode.

According to a second aspect of the present invention, there is a provided a method of controlling the Mach-Zehnder type semiconductor device according to the first aspect of the present invention. The method includes the following steps. A continuous light is entered into the entrance waveguide. A first voltage which is given by a sum of a modulated voltage having a low level indicating an OFF state and a negative DC bias voltage is applied to the modulation electrode. A positive bias voltage is applied to the positive bias electrode so as to minimize optical intensity of the outgoing light emitted from the exit waveguide of the Mach-Zehnder type semiconductor device. First and second bias voltages which are smaller than the negative DC bias voltage are applied to the first and second negative bias electrodes, respectively.

The Mach-Zehnder type semiconductor device of the present invention includes the modulating electrode on the first branch waveguide and the phase adjusting electrode group on the second branch waveguide. The phase adjusting electrode group has the first negative bias electrode, the positive bias electrode, and the second negative bias electrode to which the negative bias voltage is applied. By applying the positive bias voltage between the positive bias electrode and the common electrode which is connected to the earth potential, carriers are injected into a region of the second branch waveguide which is sandwiched by the positive bias electrode and the common electrode. As a result, plasma effect of the carries causes a change of reflection index of the region of the second branch waveguide, so that the phase of the second split light passing through the region of the second branch waveguide can be modified.

The positive bias electrode is provided between the first negative bias electrode and the second negative bias electrode. The first and second negative bias voltages are applied across the common electrode and the first and second negative bias electrodes, respectively. Thereby, the carriers injected into regions of the second branch waveguide which are sandwiched by the common electrode and the first and second negative bias electrodes, respectively, can be transferred from the second branch waveguide to the semiconducting layer. As a result, deterioration of an eye pattern originating in the carriers injected by applying the positive bias voltage can be prevented.

DETAILED DESCRIPTION OF THE INVENTION

Embodiments of the present invention will be now described with reference to drawings. Each of the drawings schematically illustrates only shapes of, sizes of, and arrangement of components to the extent of which the present invention can be understood. Materials and numerical conditions of the components are preferred examples. The present invention is not limited to the following embodiments.

First Embodiment

Figure 1A:
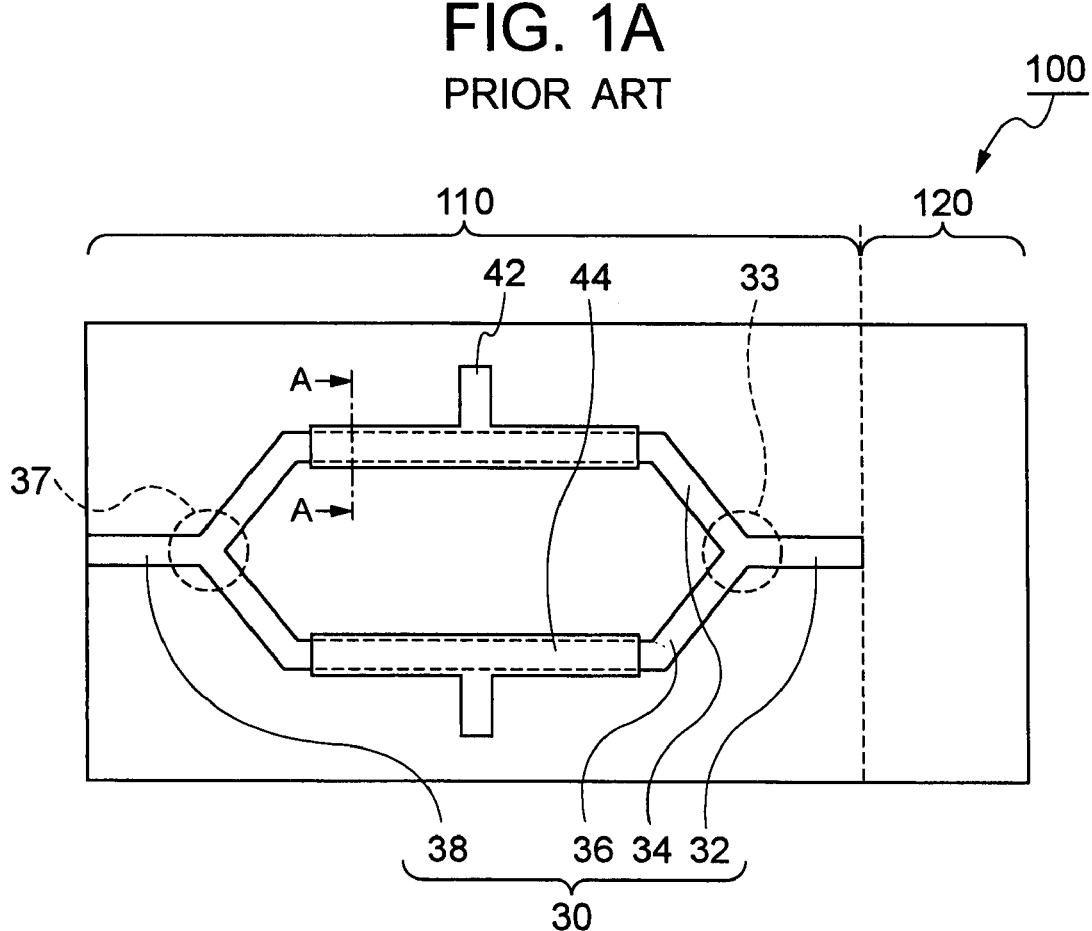
FIG. 1A is a schematic plan view showing a conventional MZ type semiconductor device.
Figure 1B:
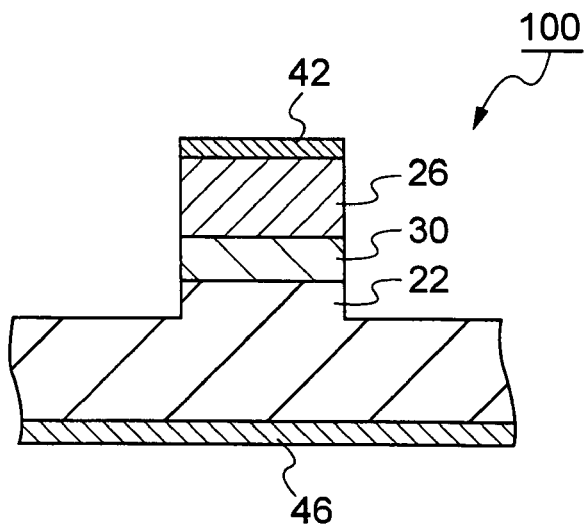
FIG. 1B is a schematic cross-sectional view showing the conventional MZ type semiconductor device taken along A-A line in FIG. 1A.
Figure 2A:
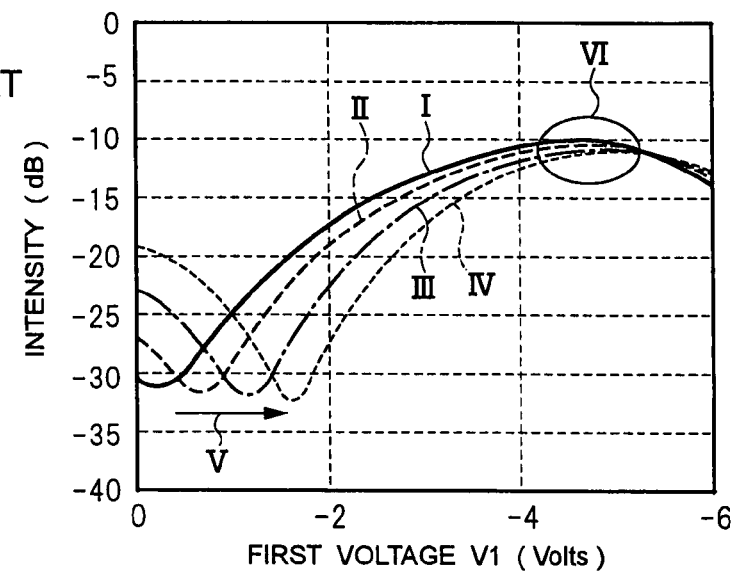
FIG. 2A is a graph showing an optical characteristic for the conventional MZ type semiconductor device.
Figure 2B:
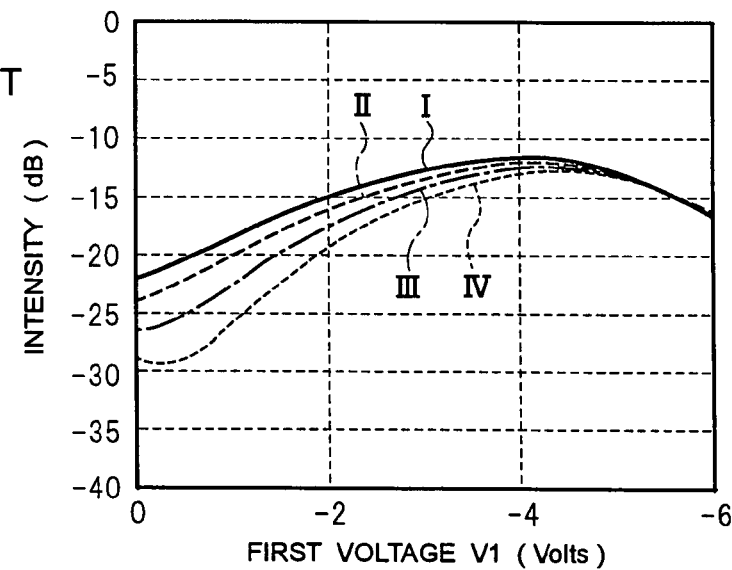
FIG. 2B is a graph showing an optical characteristic for the conventional MZ type semiconductor device.
Figure 2C:
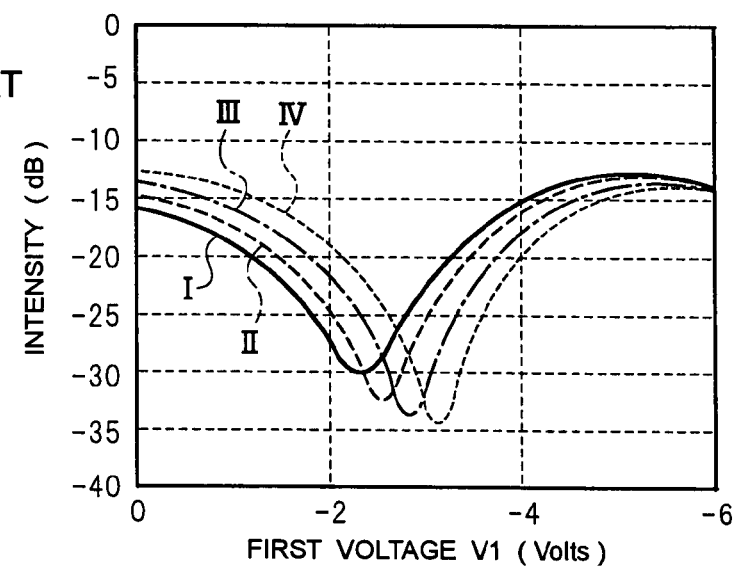
FIG. 2C is a graph showing an optical characteristic for the conventional MZ type semiconductor device.
Figure 3:
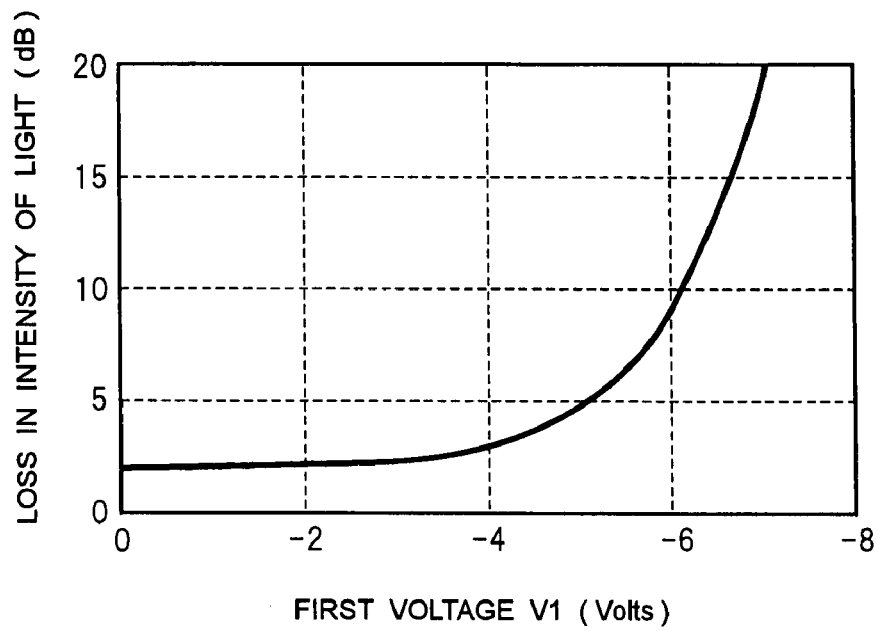
FIG. 3 is a graph showing a voltage dependence of optical intensity for the conventional MZ type semiconductor device.
Figure 4:
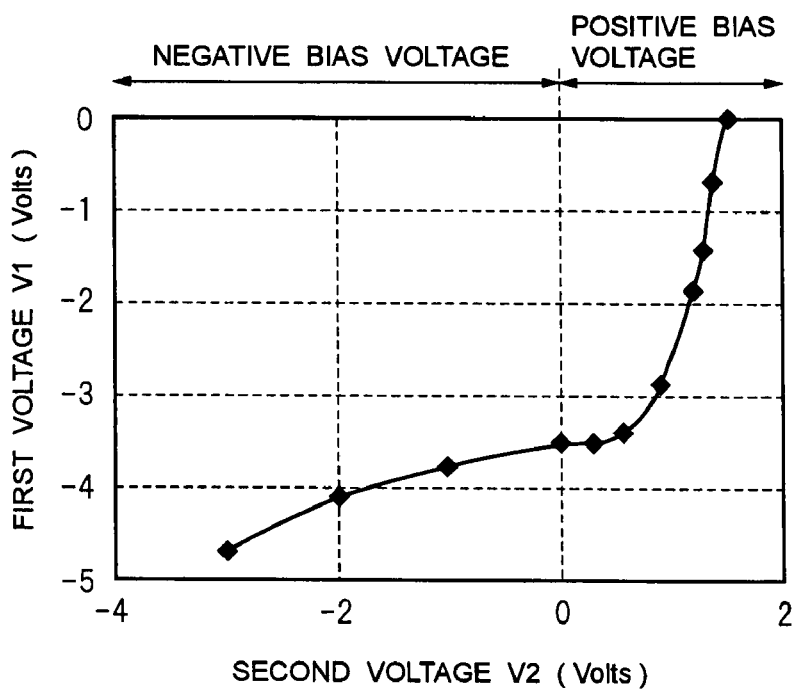
FIG. 4 is a graph showing an optical characteristic for describing a phase adjustment effect of the conventional MZ type semiconductor device.
Figure 5A:
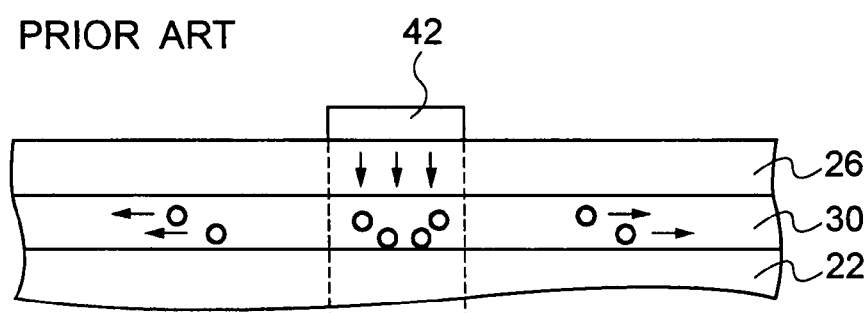
FIG. 5A is a schematic drawing representing a carrier injection by applying a positive bias voltage for the conventional MZ type semiconductor device.
Figure 5B:
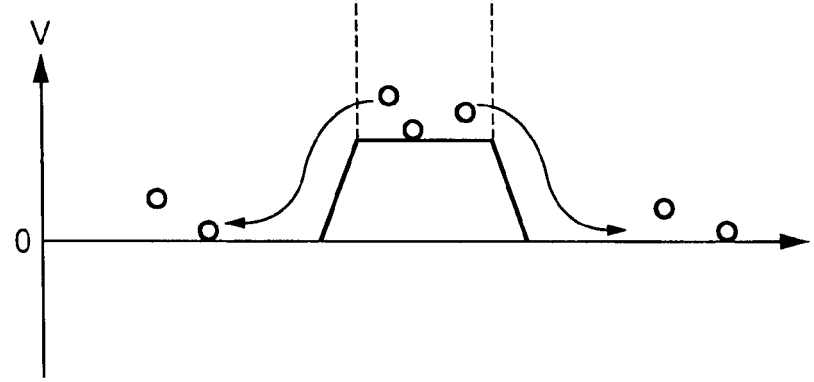
FIG. 5B is a schematic drawing representing a carrier injection by applying a positive bias voltage for the conventional MZ type semiconductor device.
Figure 6A:
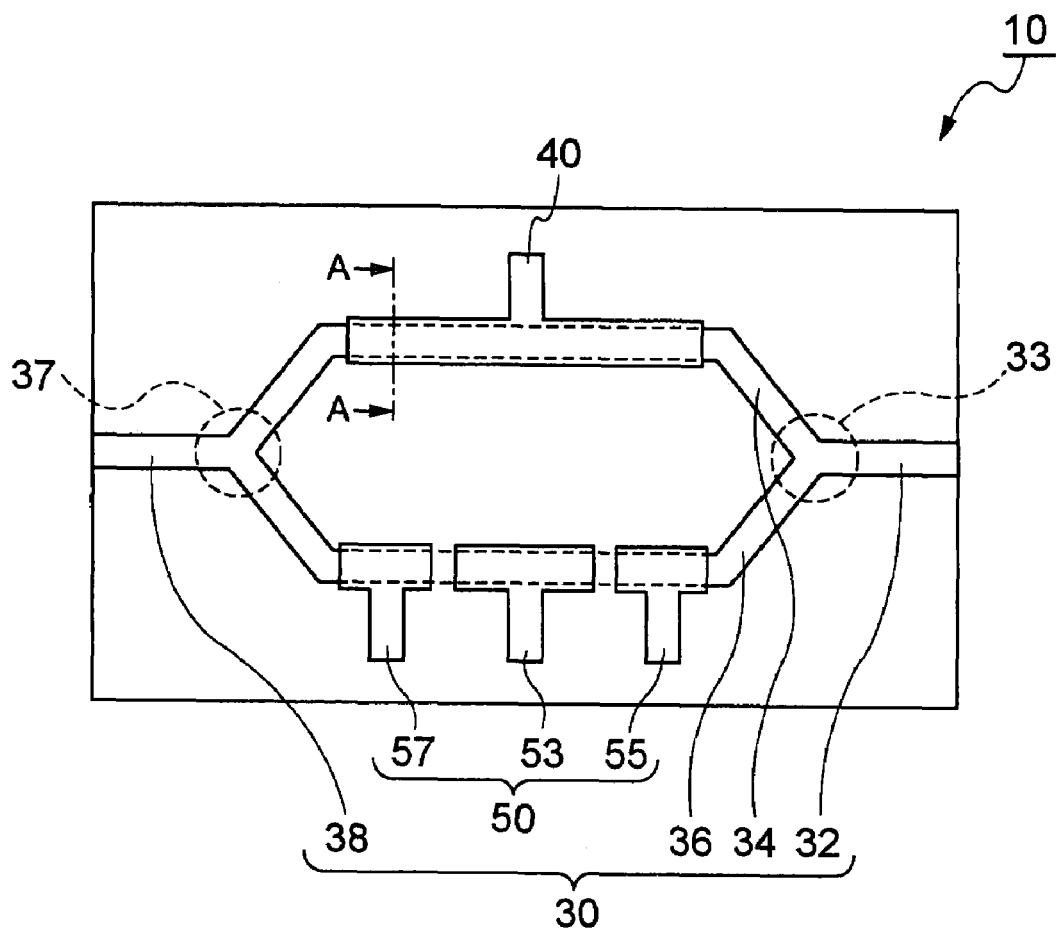
FIG. 6A is a schematic plan view showing a MZ type semiconductor device which is a first embodiment of the present invention.
Figure 6B:
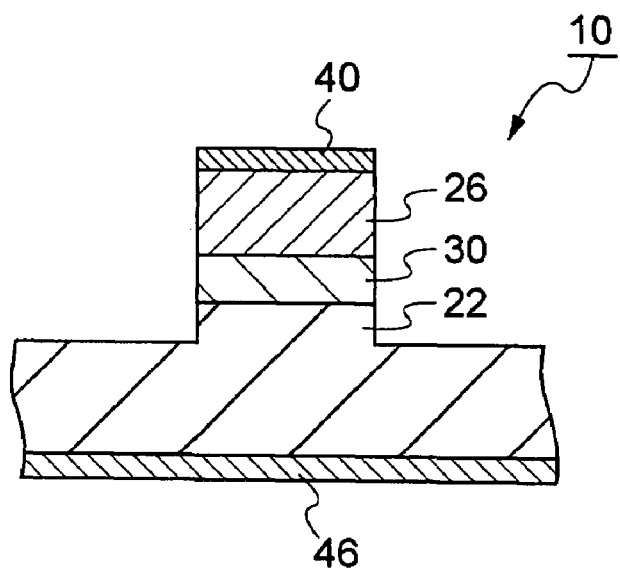
FIG. 6B is a schematic cross-sectional view showing the MZ type semiconductor device taken along A-A line in FIG. 6A.

A configuration of a MZ type semiconductor device which is a first embodiment of the present invention will be described with reference to FIGS. 6A and 6B. FIGS. 6A and 6B are schematic drawings for describing the MZ type semiconductor device of the first embodiment. FIG. 6A is a schematic plan view showing the MZ type semiconductor device which is the first embodiment of the present invention. FIG. 6B is a schematic cross-sectional view showing the MZ type semiconductor device taken along A-A line in FIG. 6A.

In the MZ type semiconductor device of the first embodiment, a semiconductor substrate having a first conductive type is described as an n-type semiconductor substrate, and a semiconducting layer having a second conductive type is described as a p-type semiconductor layer. It is to be noted that the embodiment is not limited to the configuration. Even if a p-type semiconductor substrate and an n-type semiconducting layer are employed as a semiconductor substrate having the first conductive type and a semiconductor layer having the second conductive type, respectively, effects will be obtained similarly to the first embodiment.

A MZ type semiconductor device 10 includes an n-InP substrate 22 prepared as an n-type semiconductor substrate, a waveguide layer 30, and a p-InP layer 26 prepared as a p-type semiconductor substrate. The waveguide layer 30 and the p-InP layer 26 are sequentially formed on one of principle surfaces of the n-InP substrate 22, that is, an upper surface of then-InP substrate 22. The waveguide layer 30 has, for example, a multiple quantum well (MQW: Multi-Quantum Well) structure fabricated with semiconducting compound such as InGaAsP system. It is to be noted that the semiconducting compounds are not limited to the above-mentioned example. The semiconducting compound such as InAlAs system etc. may be used according to a wave-length of incident light etc. The p-InP layer 26 is omitted in FIG. 6A for simplicity. In addition, a cap layer for protecting the device is omitted in FIGS. 6A and 6B.

The waveguide layer 30 has an entrance waveguide 32, an optical splitter 33, a first branch waveguide 34, a second branch waveguide 36, an optical coupler 37, and an exit waveguide 38. The entrance waveguide 32 guides propagation of an incident light to the optical splitter 33. The incident light is irradiated from outside of MZ type semiconductor device 10.

The optical splitter 33, which is connected to the entrance waveguide 32, splits the incident light transmitting through the entrance waveguide 32 into first and second split lights.

The first branch waveguide 34, which is connected to the optical splitter 33 and the optical coupler 37, guides propagation of the first split light split by the optical splitter 33 to the optical coupler 37.

The second branch waveguide 36, which is connected to the optical splitter 33 and the optical coupler 37, guides propagation of the second split light split by the optical splitter 33 to the optical coupler 37.

The optical coupler 37 recombines the first split light and the second split light, whereby to generate an outgoing light.

The exit waveguide 38, which is connected to the optical coupler 37, guides propagation of the outgoing light. The outgoing light transmitting through the exit waveguide 38 is emitted by the MZ type semiconductor device 10.

The MZ type semiconductor device 10 further includes a modulating electrode 40, a first negative bias electrode 55, a positive bias electrode 53, and a second negative bias electrode 57. The modulating electrode 40 is formed above the first branch waveguide 34. The first negative bias electrode 55, the positive bias electrode 53, and the second negative bias electrode 57 are formed above the second branch waveguide 36, arranged in sequence in the direction of propagation of the second split light, and separated with each other.

The common electrode 46 is provided on the other of principle surfaces of the n-InP substrate 22 which is revert to the one of principle surfaces of the n-InP substrate 22 on which the waveguide layer 30 is formed. The common electrode 46 is connected to, for example, an earth potential.

The modulating electrode 40 has a function of changing a refraction index in a region of the first branch waveguide 34 which is sandwiched by the modulating electrode 40 and the common electrode 46 by applying a modulation voltage across both electrodes 40 and 46. The positive bias electrode 53 has a function of changing a refraction index in a region of the second branch waveguide 36 which is sandwiched by the positive bias electrode 53 and the common electrode 46. By applying a positive bias voltage across the positive bias electrode 53 and the common electrode 46, carriers are injected into the region of the second branch waveguide 36. Thus, the refraction index in the region of the second branch waveguide 36 can be changed. First and second negative bias voltages are applied across the common electrode 46 and the first and second negative bias electrodes 55 and 57, respectively, and thus the carriers doped into the second waveguide layer 36 are removed into the p-InP layer 26. Therefore, each of the first and second negative bias electrodes 55 and 57 has a function of removing the carriers injected into the second waveguide layer 36 to the p-InP layer 26. The first negative bias electrode 55, the positive bias electrode 53, and the second negative bias electrode 57 compose a phase adjusting electrode group 50. Magnitude of the voltage applied to these electrodes 40, 53, 55, and 57 are different from each other, which are dependent on lengths etc. of these electrodes 40, 53, 55, and 57. The detailed will be described later.

The waveguide of the MZ type modulator provided on the semiconductor substrate may be arbitrarily and suitably formed by use of a conventional method. A method of fabricating the waveguide on the semiconductor substrate is omitted here. A ridge-type waveguide is shown in FIG. 6A. The waveguide structure is not limited to the ridge-type waveguide. The waveguide may have a semiconductor buried structure (BH: Buried Heterostructure).

An operation of the MZ type semiconductor device 10 of the first embodiment will be now described with reference to FIGS. 7A, 7B, 8A, and 8B.

A first voltage V1 is applied to the modulating electrode 40. The first voltage V1 is given by a sum of a modulation voltage for modulating the first split light and a DC bias voltage. The modulation voltage is supplied as, for example, a RZ (RZ: Return to Zero) signal having a low (L) level indicating an ON state and a high (H) level indicating an OFF state. The DC bias voltage is 0 volts or a negative DC voltage.

When the first voltage V1 is applied to the modulating electrode 40, the refraction index in a region of the first branch waveguide 34 which is under the modulating electrode 40 is changed in response to the modulation voltage having the H or L levels, and thus the first split light is modulated.

A positive bias voltage is applied to the positive bias electrode 53.

By applying a positive bias voltage to the positive bias electrode 53, carriers are injected into a region of the second branch waveguide 36 which is sandwiched by the positive bias electrode 53 and the common electrode 46. A plasma effect of the carriers injected into the second branch waveguide 36 causes a change of refraction index in the second branch waveguide 36. By using the change of refraction index in the second branch waveguide 36 due to the plasma effect, an optical length of the second branch waveguide 36 can be changed, so that the second split light can be adjusted in phase.

On the other hand, first and second negative bias voltages are applied to the first negative bias electrode 55 and the second negative bias electrode 57, respectively, according to the MZ type semiconductor device 10 of the first embodiment of the present invention. A reason for applying these negative bias voltages is that deterioration in an eye pattern of the outgoing light, which is attributed to carriers injected into the second branch waveguide 36 by applying the positive bias voltage to the positive bias electrode 53, is prevented.

Figure 7A:
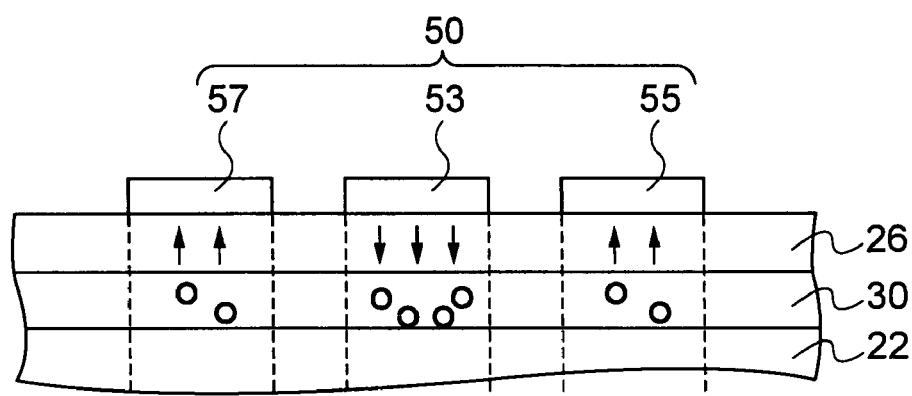
FIG. 7A is a schematic explanation drawing representing a carrier injection for the MZ type semiconductor device shown in FIG. 6A.
Figure 7B:
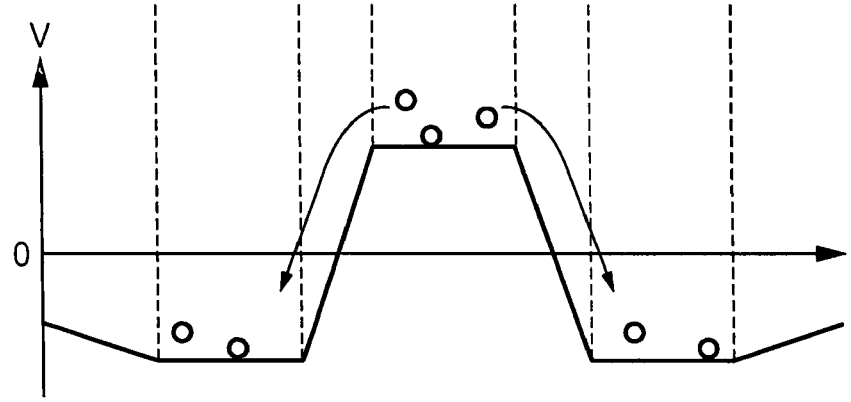
FIG. 7B is a schematic explanation drawing representing a carrier injection for the MZ type semiconductor device shown in FIG. 6A.

FIGS. 7A and 7B are drawings for describing operations of the MZ type semiconductor device 10 according to the first embodiment of the present invention. FIG. 7A schematically shows the operation of the MZ type semiconductor device 10 of the first embodiment. A horizontal axis of FIG. 7B represents a position (arbitrary unit) in the direction of propagation of the light and a vertical axis represents an electrical potential V (arbitrary unit). FIGS. 7A and 7B show behaviors of carriers injected into the second branch waveguide 36. The carriers are injected by applying the first and the second negative bias voltages across the common electrode 46 and the first and second negative bias electrodes 55 and 57, respectively, and by applying the positive bias voltage across the positive bias electrode 53 and the common electrode 46. The carriers injected by applying the first and the second negative bias voltages is are not removed from the waveguide layer 30 to the semiconducting layer 26 which is formed above the waveguide layer 30. And also, the injected carriers are not diffuse out of a region of the waveguide layer 30 which exists under the phase adjusting electrode group 50.

Figure 8A:
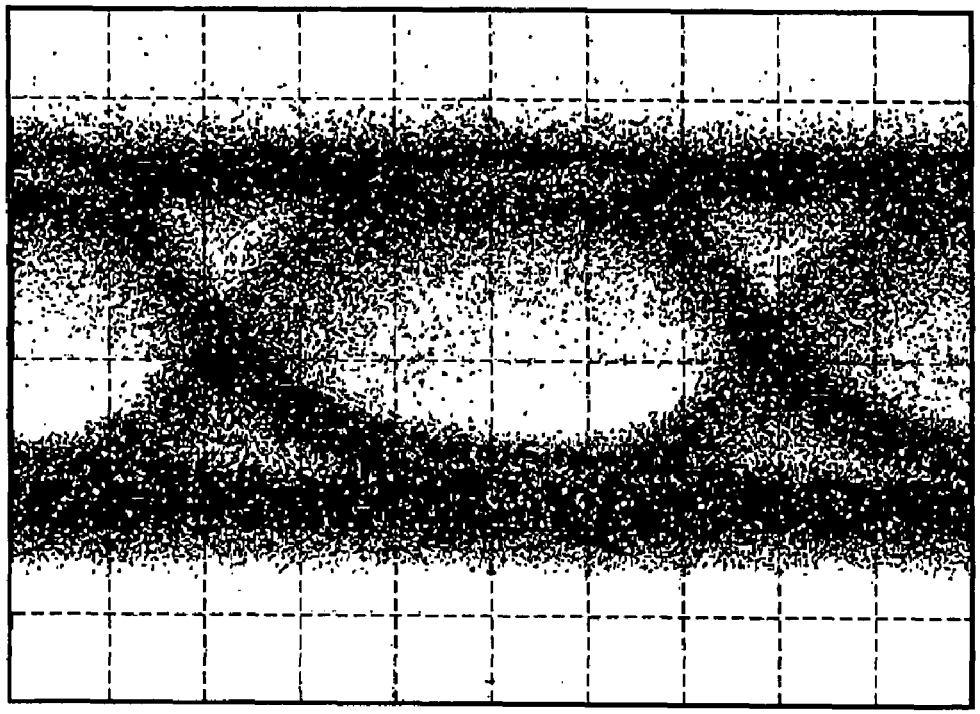
FIG. 8A is a graph showing an eye pattern of a light emitted by the MZ type semiconductor device shown in FIG. 6A.
Figure 8B:
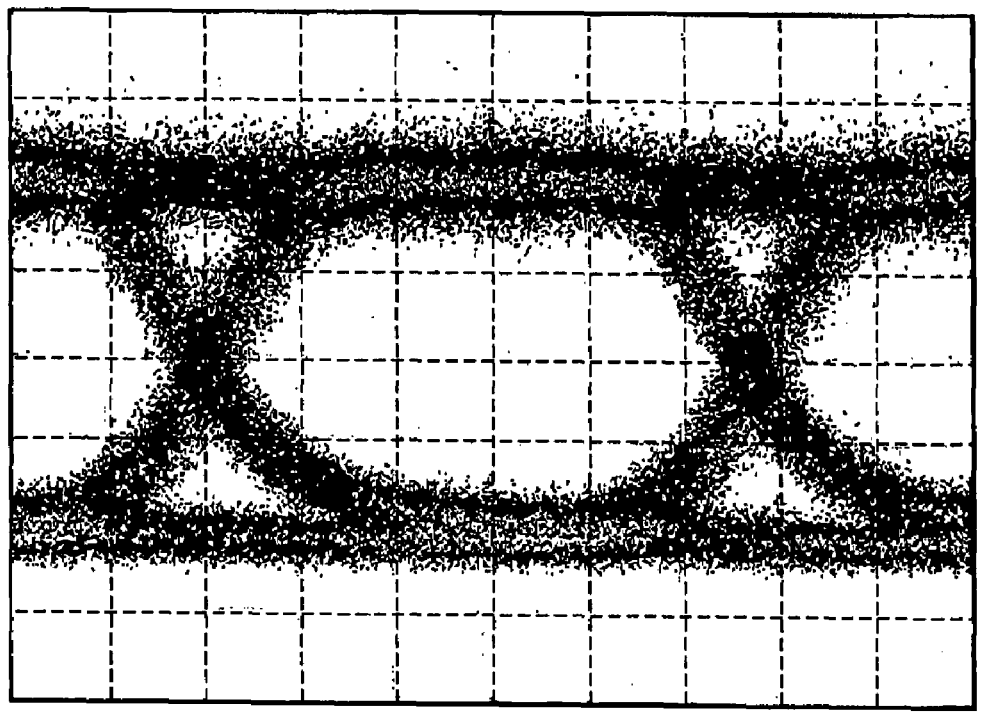
FIG. 8B is a graph showing an eye pattern of a light emitted by the MZ type semiconductor device shown in FIG. 6A.

FIGS. 8A and 8B show eye patterns of the outgoing lights for the case that the positive bias voltage is applied. The horizontal axis represents time (arbitrary units) and the vertical axis represents intensity of the outgoing light (arbitrary units). FIG. 8A is an eye pattern of the outgoing light which is obtained when the negative bias voltages having sufficient magnitudes are not applied to the first negative bias electrode 55 and the second negative bias electrode 57. FIG. 8B is an eye pattern of the outgoing light which is obtained when the negative bias voltages having sufficient magnitudes are applied to the first negative bias electrode 55 and the second negative bias electrode 57.

It is measured from the eye pattern shown in FIG. 8A that the carriers injected into the waveguide layer 30 are not sufficiently removed to the semiconducting layer 26 because the negative bias voltages are not sufficiently applied to the first negative bias electrode 55 and the second negative bias electrode 57. On the other hand, it is measured from the eye pattern shown in FIG. 8B that the carriers injected into the waveguide layer 30 are sufficiently removed to the semiconducting layer 26 because the negative bias voltages are sufficiently applied to the first negative bias electrode 55 and the second negative bias electrode 57. It is understood that an aperture of the eye pattern shown in FIG. 8B is larger compared to that shown in FIG. 8A.

As described above, the MZ type semiconductor device 10 according to the first embodiment of the present invention includes the modulating electrode 40 provided above the first branch waveguide 34 and further includes the phase adjusting electrode group 50 having the first negative bias electrode 55, positive bias electrode 53, and the second negative bias electrode 57, which is provided above the second branch waveguide 36.

By applying the positive bias voltage across the positive bias electrode 53 and the common electrode 46, carriers are injected into a region of the second branch waveguide 36 which exists between the positive bias electrode 53 and the common electrode 46. The reflection index in the region of the second branch waveguide 36 is changed, which originates in the plasma effect of the carriers, so that the second split light transmitting through the second branch waveguide 36 can be adjusted in phase.

By applying the first and the second negative bias voltages to the first negative bias electrode 55 and the second negative bias electrode 57 respectively, both of which sandwich the positive bias electrode 53, the carriers injected into the second branch waveguide 36 can be removed out of the second branch waveguide 36. Thus, deterioration in the eye pattern originating in the carriers injected by applying the voltage of positive bias can be prevented.

A method of controlling the Mach-Zehnder type semiconductor device of the present invention, that is, a method of configuring the first negative bias voltage, the positive bias voltage, and the second negative bias voltage, includes the following steps.

First of all, a continuous light emitted by a semiconductor laser etc. is incident into the entrance waveguide 32.

A first voltage, which is given by a sum of a modulation voltage having an L level indicating an OFF state and a negative DC bias voltage, is applied to the modulating electrode 40. It should be noted that the negative DC bias voltage is not positive and may be zero volts.

The outgoing light emitted from the exit waveguide 38 of the MZ type semiconductor device 10 is minimized in optical intensity by applying the positive bias voltage to the positive bias electrode while monitoring the optical intensity of the outgoing light by use of a conventional measuring instrument.

The first negative bias voltage and the second negative bias voltage having small magnitudes are applied to the first negative bias electrode 55 and the second negative bias electrode 57, respectively. The first negative bias voltage and the second negative bias voltage is configured so as not to cause the deterioration in the eye pattern while monitoring the eye patterns as described with reference to FIGS. 8A and 8B. It is preferable that the first negative bias voltage and the second negative bias voltage are smaller than the negative DC bias voltage which is added to the first voltage applied to the modulation electrode 40.

As will be described later, in the case that the first and the second negative bias electrodes are shorter in length than the positive bias electrode, a change in the optical length originating in the applied first negative bias voltage and the second negative bias voltage can be disregarded. When the change in the optical length originating in the applied first and second negative bias voltages can not be disregarded, the positive bias voltage may be adjusted after the first negative bias voltage and the second negative bias voltage are applied.

When a MZ type semiconductor device is manufactured, it is preferable that the device length L is shorted as much as possible. That is, it is preferable that the positive bias electrode and the first and second negative bias electrodes are formed shortly in the direction of propagation of the lights.

On the other hand, the positive bias voltage applied to the positive bias electrode 53 is in inverse proportion to the length of positive bias electrode 53. The applied positive bias voltage decreases as increasing in length of the positive bias electrode 53 and increases as decreasing in length of the positive bias electrode 53. In order to decrease the positive bias voltage, it is necessary to increase in length of the positive bias electrode 53.

If the positive bias electrode 53 having a length of about 100 micro meters is formed for example, the phase adjustment effect which is described with reference to FIGS. 7A and 7B is achieved. It is, therefore, preferable that the length of positive bias electrode 53 is about 100 micro meters. In this case, the MZ type semiconductor device can be driven under the positive bias voltage of 3.3 volts or less and with a power supply shared with other optical device.

The positive bias voltage applied to the positive bias electrode 53 is adjusted as follows. The DC bias voltage, which is added to the first voltage applied to the modulation electrode 40, may be adjusted according to need of the semiconductor device of the present invention. For instance, the DC bias voltage which is added to the first voltage V1 may be 0 volts and a negative voltage of about −1 volts.

On the other hand, the lengths of the first negative bias electrode 55 and the second negative bias electrode 57 are so defined that the carriers injected into the second branch waveguide 36 do not extend over a region of the second branch waveguide 36 which exists under the first negative bias electrode 55 and the second negative bias electrode 57 and do not leak out a region of the second branch waveguide 36 which exists under the phase adjusting electrode group 50. It is preferable that each length of the first and second negative bias electrodes 55 and 57 corresponds to a diffusion length of the carriers, and in this case, is 5 to 10 micro meters. The leakage of the carriers can be prevented if the lengths of first and second negative bias electrodes 55 and 57 are in a range of the diffusion length of the carriers, so that deterioration in the eye pattern can be prevented. In addition, it is preferable that gaps between the positive bias electrode 53 and the first negative bias electrode 55 and between the positive bias electrode 53 and the second negative bias electrode 57 are about 10 micro meters.

In the case, the first negative bias voltage and the second negative bias voltage which are applied to the first negative bias electrode 55 and the second negative bias electrode 57, respectively, are negative. It is preferable that absolute values of the first and second negative bias voltages are larger than that of the DC bias voltage added to the first voltage V1. Although the first negative bias voltage and the second negative bias voltage are not necessarily equivalent to each other, it will be easy to apply the voltages if both of them are equivalent.

The numeric values described above are merely exemplifications, and thus the first embodiment of the present invention is not limited to these numeric values. The lengths of the electrodes and the gap sizes between the electrodes may be selected according to a demanded device length and usable bias voltages etc.

Second Embodiment

Figure 9:
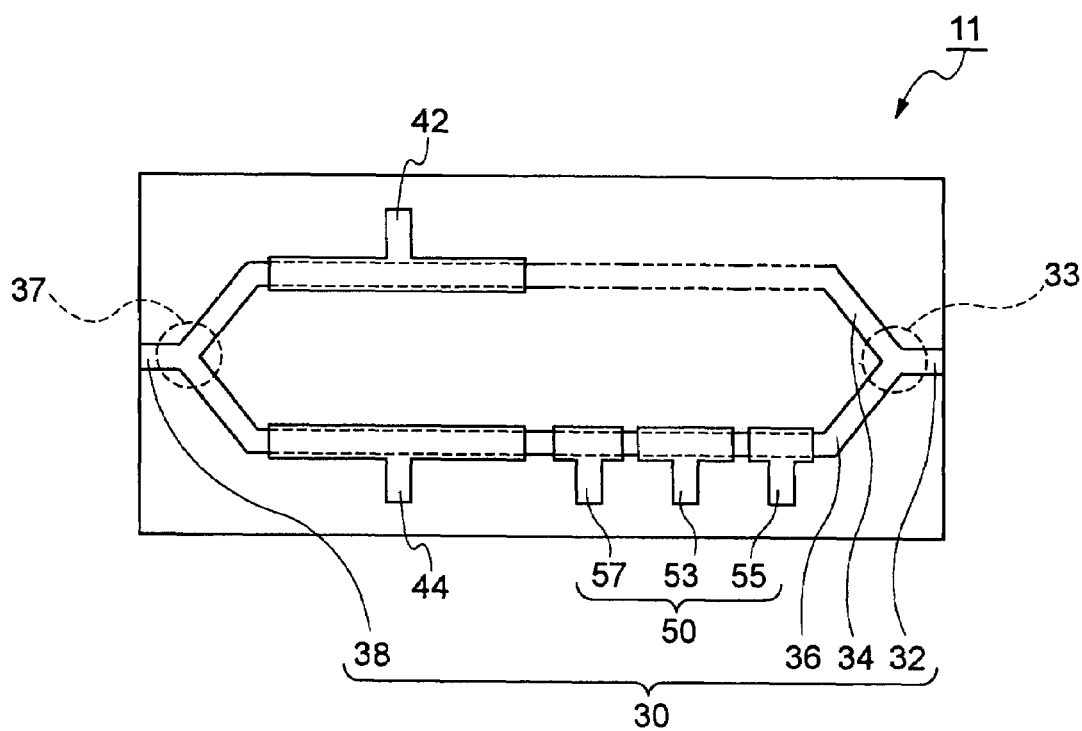
FIG. 9 is a schematic plan view showing a MZ type semiconductor device which is a second embodiment of the present invention.

A MZ type semiconductor device which is a second embodiment of the present invention will be now described with reference to FIG. 9. FIG. 9 is a schematic plan view showing the second embodiment of the present invention.

The MZ type semiconductor device 11 shown in FIG. 9 has a first modulating electrode 42 and a second modulating electrode 44 which are not provided with the MZ type semiconductor device 10 shown in FIG. 6A. The first modulating electrode 42, through which a modulation voltage is applied to a first branch waveguide 34, is provided above a first branch waveguide 34. The second modulating electrode 44, through which the modulation voltage is applied to a second branch waveguide 36, is provided above a second branch waveguide 36. Other components excluding these modulating electrodes 42 and 44 in FIG. 9 are not be described here because they are similar to that shown in FIG. 6A.

By providing the modulating electrodes with the first and second branch waveguides, first and second split lights can be modulated by an inverse phase modulation voltage. By applying the inverse phase modulation voltage, modulation voltages can be decreased and transmission properties of the first and second branch waveguides can be improved.

It is preferable that a phase adjusting electrode group 50 is arranged between a second modulating electrode 44 and an optical splitter 33, both of which are formed above the second branch waveguide 36. A reason is that the second split light modulated by the second modulating electrode 44 is not influenced by a fluctuation of refraction index in a region of a waveguide 30 above which the phase adjusting electrode group 50 is provided. The fluctuation of refraction index originates in carrier injected into the waveguide 30.

In the case that a plurality of modulation electrodes are provided as the MZ type semiconductor device of the second embodiment, it is preferable that the first and second negative bias voltages are negative bias voltages, absolute values of which are larger than either one of the largest absolute values of DC bias voltages applied to the first modulating electrode or the second modulating electrode.

Third Embodiment

Figure 10:
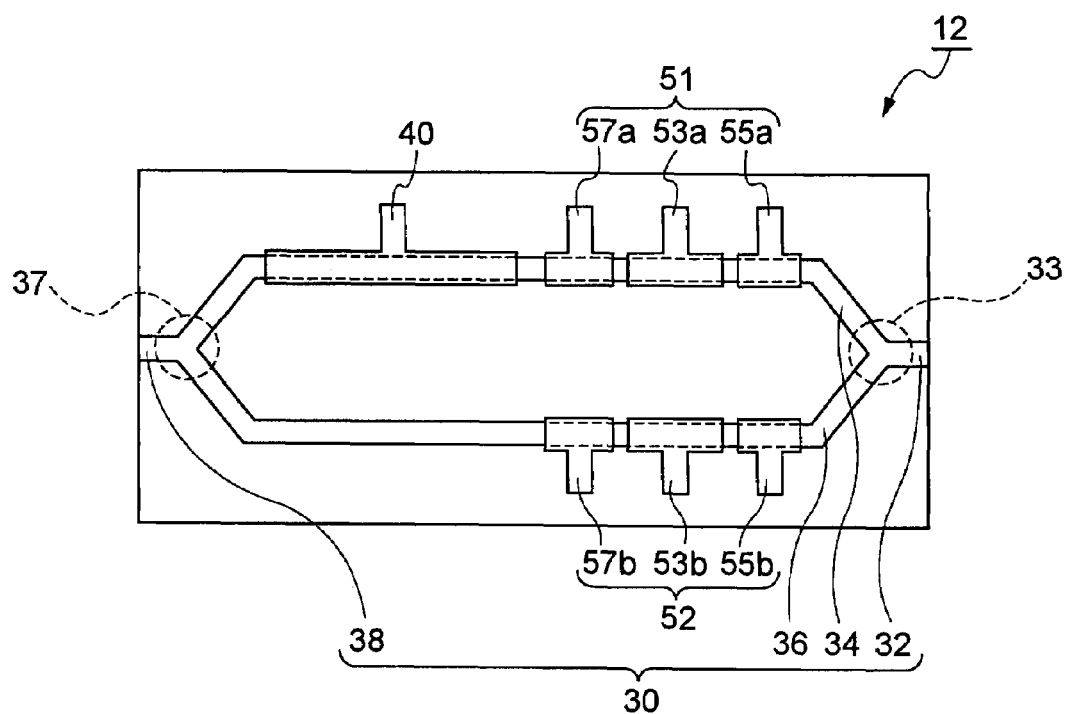
FIG. 10 is a schematic plan view showing a MZ type semiconductor device which is a third embodiment of the present invention.

A MZ type semiconductor device that is a third embodiment will be described with reference to FIG. 10. FIG. 10 is a schematic plan view showing the MZ type semiconductor device of the third embodiment.

A MZ type semiconductor device 12 of the third embodiment includes a modulating electrode 40, a first phase adjusting electrode group 51 as a phase adjusting electrode group, and a second phase adjusting electrode group 52 as a phase adjusting electrode group. The modulating electrode 40 and the first phase adjusting electrode group 51 are provided above a first branch waveguide 34. The second phase adjusting electrode group 52 is provided above a second branch waveguide 36.

Excluding the modulating electrode 40 and the first phase adjusting electrode group 51, both of which are formed above the first branch waveguide 34, the MZ type semiconductor device 12 of the third embodiment are designed similarly to the MZ type semiconductor device 10 of the first embodiment. Details of the components excluding the modulating electrode 40 and the first phase adjusting electrode group 51 are omitted here.

The modulating electrode 40 is used for applying a modulation voltage to the first branch waveguide 34. The first phase adjusting electrode group 51 are configured similarly to the phase adjusting electrode group (denoted by 50 in FIG. 6A) which is described with reference to FIG. 6A. That is, the first phase adjusting electrode group 51 has a first negative bias electrode 55a to which a first negative bias voltage is applied, a first positive bias electrode 53a to which a first positive bias voltage is applied, and a second negative bias electrode 57a to which a second negative bias voltage is applied, which are arranged in sequence in the direction of propagation of a first split light. The second phase adjusting electrode group 52 having components similar to the first phase adjusting electrode group 51 is provided with a third negative bias electrode 55b to which a third negative bias voltage is applied, a second positive bias electrode 53b to which a second positive bias voltage applied, and a fourth negative bias electrode 57b to which a fourth negative bias voltage is applied, which are arranged in the direction of propagation of a second split light.

Both of the first branch waveguide 34 and the second branch waveguide 36 have the phase adjustment electrode groups, so that a positive bias voltage may be applied to either one of the first branch waveguide 34 or the second branch waveguide 36. The positive bias voltage may be applied to, for example, either one of the branch waveguides having a length longer than the other. Therefore, phases of the first and second split lights can be adjusted by applying a smaller bias voltage compared to the case that the positive bias voltage are applied to both of the first branch waveguide 34 and the second branch waveguide 36.

If the positive bias voltage is applied to either one of the first positive bias electrode 53a or the second positive bias electrode 53b, a phase adjusting electrode group having the positive bias electrode to which the positive bias voltage is not applied may not be applied to a negative bias voltage. For example, if the positive bias voltage is applied to only the first positive bias electrode 53a and is not applied to the second positive bias electrode 53b, the third and fourth bias electrodes 55b and 57b, both of which are included by the second phase adjusting electrode group 52, may not be applied to the negative bias voltages.

Fourth Embodiment

Figure 11:
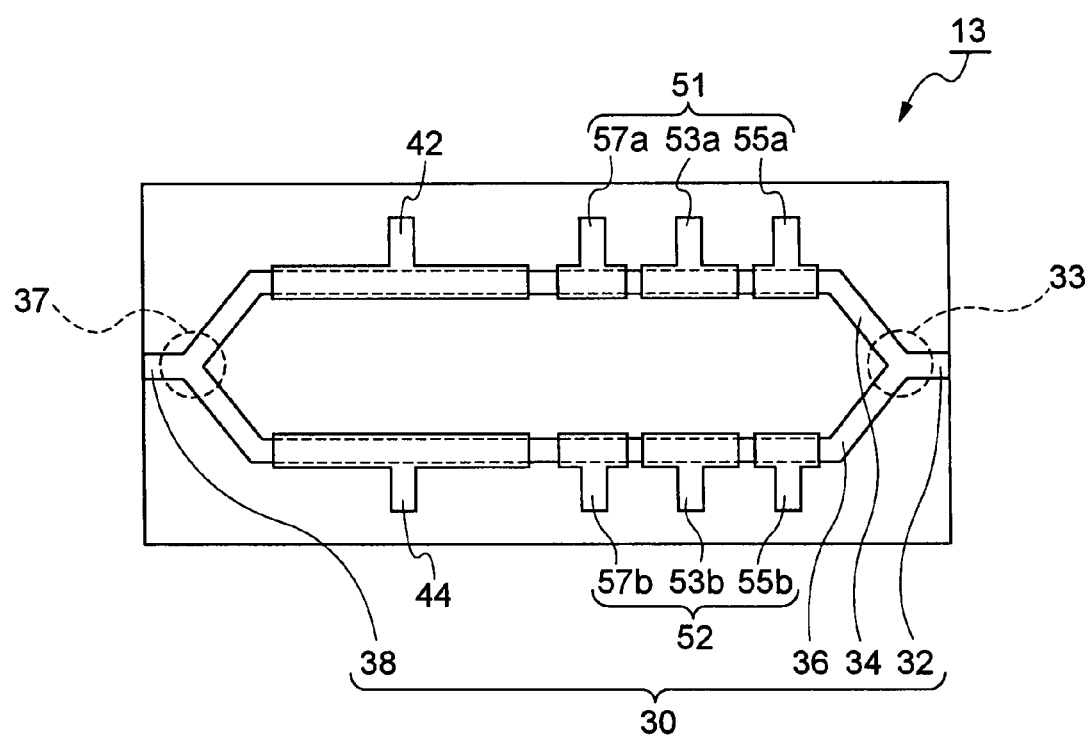
FIG. 11 is a schematic plan view showing a MZ type semiconductor device which is a fourth embodiment of the present invention.

A MZ type semiconductor device which is a fourth embodiment of the present invention will be now described with reference to FIG. 11. FIG. 11 is a schematic plan view showing the MZ type semiconductor of the fourth embodiment of the present invention.

A MZ type semiconductor device 13 shown in FIG. 11 includes a first modulating electrode 42 and a second modulating electrode 44, both of which is not provided with the MZ type semiconductor device of the third embodiment. Other components shown in FIG. 11 are similar to that of the third embodiment shown in FIG. 10. The first modulating electrode 42 is provided above a first branch waveguide 34 as a modulating electrode to which a modulation voltage is applied. The second modulating electrode 44 is provided above a second branch waveguide as a modulating electrode to which a modulation voltage is applied. Details of the components excluding the first modulating electrode 42 and the second modulating electrode 44 are omitted here.

If a plurality of the modulating electrodes are provided as the MZ type semiconductor device of the fourth embodiment, it is preferable that first to fourth negative bias voltages are negative bias voltages, absolute values of which are larger than either the largest one of absolute values of DC bias voltages applied to the first modulating electrode or the second modulating electrode.

By providing the modulating electrodes with the first and second branch waveguides, first and second split lights can be modulated by an inverse phase modulation voltage. By applying the inverse phase modulation voltage, modulation voltages can be decreased and transmission properties of the first and second branch waveguides can be further improved.

It is preferable that each of the phase adjusting electrode groups is so arranged that it is provided on the entrance side, that is, between the modulating electrode and the optical splitter because each of the first and second split lights is not influenced by fluctuations of a refraction index due to carriers injected around at a region of the waveguide layer above which the phase adjusting electrode group is provided.

This application is based on Japanese Patent Application No. 2006-072775 which is hereby incorporated.

What is claim is:

1. A Mach-Zehnder type semiconductor device comprising a waveguide layer formed on one of principal surfaces of a semiconductor substrate having a first conductive type, a semiconducting layer having a second conductive type formed on said waveguide layer, and a common electrode formed on an other of the principal surfaces of said semiconductor substrate, said other of the principal surfaces being opposite to said one of the principal surfaces, said waveguide layer including an entrance waveguide for guiding propagation of an incident light entered from outside of said Mach-Zehnder type semiconductor device, an optical splitter connected to said entrance waveguide, for splitting said incident light into a first split light and a second split light, a first branch waveguide connected to said optical splitter, for guiding propagation of said first split light, a second branch waveguide connected to said optical splitter, for guiding propagation of said second split light, an optical coupler connected to said first branch waveguide and said second branch waveguide, for recombining said first split light and said second split light so as to produce an output light, and an exit waveguide connected to said optical coupler, for guiding propagation of said output light so as to cause said output light to emit from said Mach-Zehnder type semiconductor device,
further comprising:
a modulation electrode provided above said first branch waveguide, for changing a refraction index of said first branch waveguide by applying a modulated voltage across said modulation electrode and said common electrode; and
a phase adjusting electrode group including a first negative bias electrode, a positive bias electrode, and a second negative bias electrode, which are provided above said second branch waveguide in sequence in a direction of propagation of said second split light and separated from each other, said positive bias electrode for changing a refraction index of said second branch waveguide by applying a positive bias voltage at said positive bias electrode relative to said common electrode so as to inject carriers into said second branch waveguide, said first and second negative bias electrodes for removing said carriers from said second branch waveguide to said semiconducting layer by applying a first negative bias voltage at said first negative bias electrode relative to said common electrode, and a second negative bias voltage at said second negative bias electrode relative to said common electrode.

2. A Mach-Zehnder type semiconductor device comprising a waveguide layer formed on one of principal surfaces of a semiconductor substrate having a first conductive type, a semiconducting layer having a second conductive type formed on said waveguide layer, and a common electrode formed on an other of the principal surfaces of said semiconductor substrate, said other of the principal surfaces being opposite to said one of the principal surfaces, said waveguide layer including an entrance waveguide for guiding propagation of an incident light entered from outside of said Mach-Zehnder type semiconductor device, an optical splitter connected to said entrance waveguide, for splitting said incident light into a first split light and a second split light, a first branch waveguide connected to said optical splitter, for guiding propagation of said first split light, a second branch waveguide connected to said optical splitter, for guiding propagation of said second split light, an optical coupler connected to said first branch waveguide and said second branch waveguide, for recombining said first split light and said second split light so as to produce an output light, and an exit waveguide connected to said optical coupler, for guiding propagation of said output light so as to cause said output light to emit from said Mach-Zehnder type semiconductor device,
further comprising:
a modulation electrode provided above said first branch waveguide, for changing a refraction index of said first branch waveguide by applying a modulated voltage across said modulation electrode and said common electrode;
a first phase adjusting electrode group having a first negative bias electrode, a first positive bias electrode, and a second negative bias electrode, which are provided above said first branch waveguide in sequence in a direction of propagation of said first split light and separated from each other, said first positive bias electrode changing a refraction index of said first branch waveguide by applying a first positive bias voltage at said first positive bias electrode relative to said common electrode so as to inject first carriers to said first branch waveguide, said first and second negative bias electrodes for removing said first carriers from said first branch waveguide to said semiconducting layer by applying a first negative bias voltage at said first negative bias electrode relative to said common electrode, and a second negative bias voltage at said second negative bias electrode relative to said common electrode; and
a second phase adjusting electrode group having a third negative bias electrode, a second positive bias electrode, and a fourth negative bias electrode, which are provided above said second branch waveguide in sequence in a direction of propagation of said second split light and separated from each other, said second positive bias electrode for changing a refraction index of said second branch waveguide by applying a second positive bias voltage at said second positive bias electrode relative to said common electrode so as to inject second carriers to said second branch waveguide, said third and fourth negative bias electrodes for removing said second carriers from said second branch waveguide to said semiconducting layer by applying a third negative bias voltage at said third negative bias electrode relative to said common electrode and a fourth negative bias voltage at said fourth negative bias electrode relative to said common electrode.

3. A Mach-Zehnder type semiconductor device according to claim 2, wherein said first phase adjusting electrode group is provided between said optical splitter and said modulation electrode which are provided above said first branch waveguide.

4. A Mach-Zehnder type semiconductor device comprising a waveguide layer formed on one of principal surfaces of a semiconductor substrate having a first conductive type, a semiconducting layer having a second conductive type farmed on said waveguide layer, and a common electrode formed on an other of the principal surfaces of said semiconductor substrate, said other of the principal surfaces being opposite to said one of the principal surfaces, said waveguide layer including an entrance waveguide for guiding propagation of an incident light entered from outside of said Mach-Zehnder type semiconductor device, an optical splitter connected to said entrance waveguide, for splitting said incident light into a first split light and a second split light, a first branch waveguide connected to said optical splitter, for guiding propagation of said first split light, a second branch waveguide connected to said optical splitter, for guiding propagation of said second split light, an optical coupler connected to said first branch waveguide and said second branch waveguide, for recombining said first split light and said second split light so as to produce an output light, and an exit waveguide connected to said optical coupler, for guiding propagation of said output light so as to cause said output light to emit from said Mach-Zehnder type semiconductor device,
further comprising:
a first modulation electrode provided above said first branch waveguide, for changing a reflection index of said first branch waveguide by applying a first modulated voltage across said first modulation electrode and said common electrode;
a second modulation electrode provided above said second branch waveguide, for changing a reflection index of said second branch waveguide by applying a second modulated voltage across said second modulation electrode and said common electrode; and
a phase adjusting electrode group including a first negative bias electrode, a positive bias electrode, and a second negative bias electrode, which are provided above said second branch waveguide in sequence in a direction of propagation of said second split light and separated from each other, said positive bias electrode for changing a refraction index of said second branch waveguide by applying a positive bias voltage at said positive bias electrode relative to said common electrode so as to inject carriers to said second branch waveguide, said first and second negative bias electrodes for removing said carriers from said second branch waveguide to said semiconducting layer by applying a first negative bias voltage at said first negative bias electrode relative to said common electrode, and a second negative bias voltage at said second negative bias electrode relative to said common electrode.

5. A Mach-Zehnder type semiconductor device according to claim 4, wherein said phase adjusting electrode group is provided between said optical splitter and said second modulation electrode which are provided above said second branch waveguide.

6. A Mach-Zehnder type semiconductor device comprising a waveguide layer formed on one of principal surfaces of a semiconductor substrate having a first conductive type, a semiconducting layer having a second conductive type formed on said waveguide layer, and a common electrode formed on an other of the principal surfaces of said semiconductor substrate, said other of the principal surfaces being opposite to said one of the principal surfaces, said waveguide layer including an entrance waveguide for guiding propagation of an incident light entered from outside of said Mach-Zehnder type semiconductor device, an optical splitter connected to said entrance waveguide, for splitting said incident light into a first split light and a second split light, a first branch waveguide connected to said optical splitter, for guiding propagation of said first split light, a second branch waveguide connected to said optical splitter, for guiding propagation of said second split light, an optical coupler connected to said first branch waveguide and said second branch waveguide, for recombining said first split light and said second split light so as to produce an output light, and an exit waveguide connected to said optical coupler, for guiding propagation of said output light so as to cause said output light to emit from said Mach-Zehnder type semiconductor device, further comprising:

a first modulation electrode provided above said first branch waveguide, for changing a reflection index of said first branch waveguide by applying a first modulated voltage across said first modulation electrode and said common electrode;

a first phase adjusting electrode group having a first negative bias electrode, a first positive bias electrode, and a second negative bias electrode, which are provided above said first branch waveguide in sequence in a direction of propagation of said first split light and separated from each other, said first positive bias electrode for changing a refraction index of said first branch waveguide by applying a first positive bias voltage at said first positive bias electrode relative to said common electrode so as to inject first carriers to said first branch waveguide, said first and second negative bias electrodes for removing said first carriers from said first branch waveguide to said semiconducting layer by applying a first negative bias voltage at said first negative bias electrode relative to said common electrode, and a second negative bias voltage at said second negative bias electrode relative to said common electrode;

a second modulation electrode provided above said second branch waveguide, for changing a reflection index of said second branch waveguide by applying a second modulated voltage across said second modulation electrode and said common electrode; and a second phase adjusting electrode group having a third negative bias electrode, a second positive bias electrode, and a fourth negative bias electrode, which are provided above said second branch waveguide in sequence in a direction of said second split light and separated from each other, said second positive bias electrode for changing a refraction index of said second branch waveguide by applying a second positive bias voltage at said second positive bias electrode relative to said common electrode so as to inject second carriers to said second branch waveguide, said third and fourth negative bias electrodes for removing said second carriers from said second branch waveguide to said semiconducting layer by applying a third negative bias voltage at said third negative bias electrode relative to said common electrode, and a fourth negative bias voltage at said fourth negative bias electrode relative to said common electrode.

7. A Mach-Zehnder type semiconductor device according to claim 6, wherein said first phase adjusting electrode group is provided between said optical splitter and said first modulation electrode which are provided above said first branch waveguide, and said second phase adjusting electrode group is provided between said optical splitter and said second modulation electrode which are provided above said second branch waveguide.

8. A method of controlling the Mach-Zehnder type semiconductor device according to claim 1, comprising the steps of:

entering a continuous light as the incident light into said entrance waveguide;

applying a first voltage to said modulation electrode, said first voltage being given by a sum of the modulated voltage having a low level corresponding to an OFF state and a negative DC bias voltage;

applying the positive bias voltage to said positive bias electrode so as to minimize optical intensity of said output light emitted from said exit waveguide of said Mach-Zehnder type semiconductor device; and applying the first and second negative bias voltages to said first and second negative bias electrodes, respectively, said first and second negative bias voltages being smaller than said negative DC bias voltage.

9. A method of controlling the Mach-Zehnder type semiconductor device according to either one of claims 2 or 3, comprising the steps of:

entering a continuous light as the incident light into said entrance waveguide;

applying a first voltage to said modulation electrode, said first voltage being given by a sum of the modulated voltage having a low level corresponding to an OFF state and a negative DC bias voltage;

applying the first and second positive bias voltages to said first and second positive bias electrodes, respectively, so as to minimize optical intensity of said output light emitted from said exit waveguide of said Mach-Zehnder type semiconductor device; and applying the first to fourth negative bias voltages to said first to fourth negative bias electrodes, respectively, said first to fourth negative bias voltages being smaller than said negative DC bias voltage.

10. A method of controlling the Mach-Zehnder type semiconductor device according to either one of claims 4 or 5, comprising the steps of:

entering a continuous light as the incident light into said entrance waveguide;

applying a first voltage to said first modulation electrode, said first voltage being given by a sum of the first modulated voltage having a low level corresponding to an OFF state and a first negative DC bias voltage;

applying a second voltage to said second modulation electrode, said second voltage being given by sum of the second modulated voltage having a low level corresponding to an OFF state and a second negative DC bias voltage;

applying the positive bias voltage to said positive bias electrode so as to minimize optical intensity of said output light emitted from said exit waveguide of said Mach-Zehnder type semiconductor device; and applying the first and second negative bias voltages to said first and second negative bias electrodes, respectively, said first and second negative bias voltages being smaller than either a smallest one of said first or second negative DC bias voltages, which are added to said first and second voltages, respectively.

11. A method of controlling the Mach-Zehnder type semiconductor device according to either one of claims 6 or 7, comprising the steps of:

entering a continuous light as the incident light into said entrance waveguide;

applying a first voltage to said first modulation electrode, said first voltage being given by a sum of the first modulated voltage having a low level corresponding to an OFF state and a first negative DC bias voltage;

applying a second voltage to said second modulation electrode, said second voltage being given by a sum of the second modulated voltage having a law level corresponding to an OFF state and a second negative DC bias voltage;

applying the first and second positive bias voltages to said first and second positive bias electrodes, respectively, so as to minimize optical intensity of said output light emitted from said exit waveguide of said Mach-Zehnder type semiconductor device; and applying the first to fourth negative bias voltages to said first to fourth negative bias electrodes, respectively, said first to fourth negative bias voltages being smaller than either a smallest one of said first or second negative DC bias voltages which are added to said first and second voltage, respectively.

* * * * *